United States Patent
Nam et al.

(10) Patent No.: US 9,610,835 B2
(45) Date of Patent: Apr. 4, 2017

(54) SYSTEM FOR CONTROLLING AIR FLOW RATE INTO VEHICLE ENGINE ROOM AND CONTROL METHOD THEREOF

(71) Applicant: Hyundai Motor Company, Seoul (KR)

(72) Inventors: Jongwoo Nam, Seoul (KR); Hyun Cho, Seoul (KR); Joonho Lee, Seoul (KR); Hanshin Chung, Yongin-si (KR); Dong Guk Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 104 days.

(21) Appl. No.: 14/553,457

(22) Filed: Nov. 25, 2014

(65) Prior Publication Data

US 2015/0336455 A1   Nov. 26, 2015

(30) Foreign Application Priority Data

May 20, 2014 (KR) .................. 10-2014-0060459

(51) Int. Cl.
| | |
|---|---|
| *F01P 11/20* | (2006.01) |
| *B60K 11/08* | (2006.01) |
| *F01P 7/12* | (2006.01) |
| *F16H 19/02* | (2006.01) |
| *F01P 9/00* | (2006.01) |
| *F01P 11/02* | (2006.01) |
| *F01P 3/22* | (2006.01) |
| *F01P 7/08* | (2006.01) |

(52) U.S. Cl.
CPC .............. *B60K 11/085* (2013.01); *F01P 7/12* (2013.01); *F16H 19/02* (2013.01); *F01P 3/22* (2013.01); *F01P 7/08* (2013.01); *F01P 9/00* (2013.01); *F01P 11/02* (2013.01); *F01P 11/029* (2013.01)

(58) Field of Classification Search
CPC .... F01P 11/029; F01P 3/22; F01P 9/00; F01P 7/08; F01P 11/02
USPC .......................................................... 123/41.5
IPC ................. F01P 11/029,3/22, 9/00, 7/08, 11/02
See application file for complete search history.

(56) References Cited

U.S. PATENT DOCUMENTS

| | | | | |
|---|---|---|---|---|
| 3,589,267 | A * | 6/1971 | Hosono ................... | F04D 25/14 415/148 |
| 6,928,963 | B2 * | 8/2005 | Karanik .................... | F01P 5/02 123/41.63 |
| 2002/0121420 | A1* | 9/2002 | Medamaranahally .. | F16D 35/02 192/58.61 |
| 2002/0184899 | A1* | 12/2002 | Togaru ................. | B60H 1/3208 62/133 |
| 2003/0015183 | A1* | 1/2003 | Sealy ...................... | F02B 27/02 123/563 |

(Continued)

*Primary Examiner* — Hung Q Nguyen
*Assistant Examiner* — Charles Brauch
(74) *Attorney, Agent, or Firm* — Morgan, Lewis & Bockius LLP

(57) ABSTRACT

A system for controlling an air flow rate into a vehicle engine room may include a fan shroud in which a cooling fan including a fan motor and a fan blade is mounted, a radial portion which is provided in the fan shroud while corresponding to an operation area of the fan blade, including a shutter hub positioned to a center thereof and a plurality of radial units disposed to the shutter hub and including a plurality of radial shutters selectively unfolded from the shutter hub to external circumference directions or selectively folded to the shutter hub direction, and a radial unit operating portion unfolding the plurality of radial units from the shutter hub to the external circumference directions or folding the plurality of radial units to the shutter hub direction.

19 Claims, 17 Drawing Sheets

(56) References Cited

U.S. PATENT DOCUMENTS

2012/0261110 A1* 10/2012 Katoh ................ B60H 1/00328
  165/202
2014/0086722 A1* 3/2014 Liedel ................... B60K 11/04
  415/1

* cited by examiner

SYSTEM FOR CONTROLLING AIR FLOW RATE INTO VEHICLE ENGINE ROOM AND CONTROL METHOD THEREOF

CROSS-REFERENCE TO RELATED APPLICATION

The present application claims priority to Korean Patent Application No. 10-2014-0060459 filed May 20, 2014, the entire contents of which is incorporated herein for all purposes by this reference.

BACKGROUND OF THE INVENTION

Field of the Invention

The present invention relates to a system for controlling an air flow rate into a vehicle engine room and a control method thereof, and more particularly, to a system for controlling an air flow rate into a vehicle engine room and a control method thereof, which may improve cooling performance and aero-dynamic performance of a vehicle.

Description of the Related Art

In general, a radiator for cooling an engine and a condenser for condensing a refrigerant in an air conditioner are mounted in a vehicle, and temperatures of the radiator and the condenser are lowered by operating a cooling fan. It is advantageous to quickly raise a temperature of the engine to an appropriate level when the vehicle is initially started in order to improve fuel efficiency, and the temperature of the engine needs to be maintained to an appropriate temperature.

The cooling fan is traditionally operated by an operation of the engine, but this mechanical method has a drawback in that fuel efficiency of the vehicle deteriorates because the cooling fan is always operated whenever the engine is operated.

Recently, a method of operating an electric motor is used, and in respect to the above method, the cooling fan is operated only out of necessity in response to a driving state of the vehicle, such that there is an effect of further improving fuel efficiency, and as a result, the use of this manner is increased.

Meanwhile, aero-dynamic characteristics greatly affect fuel efficiency and speed of the vehicle when a traveling speed of the vehicle is increased, and when air flowing into an engine room of the vehicle is shut off when the vehicle travels at a high speed, drag, which is generated when air passes through the engine room, is reduced so that fuel efficiency may be improved.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system for controlling an air flow rate into a vehicle engine room and a control method thereof, which may improve cooling performance and aero-dynamic performance of a vehicle.

In addition, various aspects of the present invention are directed to providing a system for controlling an air flow rate into a vehicle engine room and a control method thereof, which may reduce drag by minimizing an operation of a cooling fan, and shutting off air flowing into an engine room out of necessity.

According to various aspects of the present invention, a system for controlling an air flow rate into a vehicle engine room, may include a fan shroud in which a cooling fan including a fan motor and a fan blade is mounted, a radial portion which is provided in the fan shroud while corresponding to an operation area of the fan blade, including a shutter hub positioned to a center thereof and a plurality of radial units disposed to the shutter hub and including a plurality of radial shutters selectively unfolded from the shutter hub to external circumference directions or selectively folded to the shutter hub direction, and a radial unit operating portion unfolding the plurality of radial units from the shutter hub to the external circumference directions or folding the plurality of radial units to the shutter hub direction.

A side of each of the radial units may be overlapped with a side of a neighboring radial unit in order for each radial unit to support the neighboring radial unit.

A guide groove and a guide rail may be formed to each radial shutter, and the guide rail formed to the radial shutter positioned outside may be inserted into the guide groove formed to the radial shutter positioned inside for guiding movement of the radial shutters.

The radial unit operating portion may include a hub gear disposed to the shutter hub, a flexible gear engaged with the hub gear and an outermost shutter of the radial shutters, moving the most outer shutter to a center direction or the external circumference directions according to rotation of the hub gear, and a servo motor selectively rotating the hub gear.

A stopper may be formed to each radial shutter, and each radial shutter may be folded by the stopper when the outermost radial shutter moves toward a center of the radial portion.

A driving thread may be formed to the outermost radial shutter to be engaged with the flexible gear, and a gear guide portion may be formed to each radial shutter except for the outermost radial shutter for guiding the flexible gear.

The servo motor may be configured to control rotation speed and rotating direction.

The system for controlling the air flow rate into the vehicle engine room may further include a plurality of flaps which are provided in the fan shroud, and open and close a part of a portion where the radial portion is not mounted.

Electromagnets may be provided on the plurality of flaps so that the plurality of flaps are opened and closed in accordance with an electric current supplied to the electromagnets.

The fan shroud in which the radial shutter and the plurality of flaps are provided may be provided between an engine and a radiator.

The system for controlling the air flow rate into the vehicle engine room may further include an encapsulation that surrounds the engine room.

The system for controlling the air flow rate into the vehicle engine room may further include a control portion which controls operations of the radial unit operating portion, the flap and the cooling fan according to operation conditions of a vehicle in predetermined modes, in which the predetermined modes may include a first mode in which the plurality of flaps is closed, the radial shutter is completely closed, and operation of the cooling fan is turned off, a second mode in which the plurality of flaps is closed, the radial shutter is completely opened, and the operation of the cooling fan is controlled based on an operating state of the vehicle, a third mode in which the plurality of flaps is opened, the radial shutter is completely opened, and the operation of the cooling fan is turned off, and a fourth mode in which the plurality of flaps is closed, the open area of the radial shutter is controlled, and the operation of the cooling fan is turned off.

The system for controlling the air flow rate into the vehicle engine room may further include an atmospheric temperature sensor which measures an atmospheric temperature, and outputs a corresponding signal, a speed sensor which measures a vehicle speed, and outputs a corresponding signal, an air conditioning pressure sensor which measures air conditioning internal pressure, and outputs a corresponding signal, an air conditioning switch sensor which measures an operational signal of an air conditioning switch, and outputs a corresponding signal, and a refrigerant temperature sensor which measures a refrigerant temperature, and outputs a corresponding signal, wherein the control unit may determine the operating state of the vehicle based on the corresponding signals from the respective sensors, and controls operations of the radial unit operating portion, the plurality of flaps, and the cooling fan in accordance with the operating state of the vehicle in any one mode of the first to fourth modes.

The system for controlling the air flow rate into the vehicle engine room may further include an intercooler temperature sensor which measures a temperature of an intercooler, and outputs a corresponding signal, in which the control unit may further receive a signal from the intercooler temperature sensor so as to determine the operating state of the vehicle, and may control operations of the radial unit operating portion, the plurality of flaps, and the cooling fan in any one mode of the first to fourth modes.

According to various aspects of the present invention, a control method of a system for controlling an air flow rate into a vehicle engine room may include determining, by a control unit, an operating state of a vehicle based on sensor signals including signals of an atmospheric temperature sensor, a speed sensor, a air conditioning pressure sensor, an air conditioning switch sensor, a refrigerant temperature sensor, and a position sensor, and determining whether it is required to completely close a radial portion in accordance with the determined operating state of the vehicle, and completely closing, the radial portion, closing a plurality of flaps, and turning off operation of a cooling fan by the control unit in a state in which it is required to completely close a rotary shutter, in which the system may include the atmospheric temperature sensor which measures an atmospheric temperature, and outputs the corresponding signal, the speed sensor which measures a vehicle speed, and outputs the corresponding signal, the air conditioning pressure sensor which measures air conditioning internal pressure, and outputs the corresponding signal, the air conditioning switch sensor which measures an operational signal of an air conditioning switch, and outputs the corresponding signal, the refrigerant temperature sensor which measures a refrigerant temperature, and outputs the corresponding signal, a fan shroud in which the cooling fan including a fan motor and a fan blade is mounted, the radial portion which is provided in the fan shroud while corresponding to an operation area of the fan blade, including a shutter hub positioned to a center thereof and a plurality of radial units disposed to the shutter hub and including a plurality of radial shutters selectively unfolded from the shutter hub to external circumference directions or selectively folded to a shutter hub direction, a radial unit operating portion unfolding the plurality of radial units from the shutter hub to the external circumference directions or folding the plurality of radial units to the shutter hub direction, the plurality of flaps which are provided in the fan shroud, and opens and closes a part of a portion where the radial portion is not mounted and a control portion which controls operations of each radial unit operating portion, each flap and the cooling fan according to operation conditions of the vehicle, The method may further include determining, by the control unit, whether the operating state of the vehicle corresponds to a predetermined low-speed and high-load condition in a case in which it is not required to completely close the rotary shutter, and completely opening the radial portion, closing the plurality of flaps, and controlling the operation of the cooling fan in accordance with the operating state of the vehicle by the control unit, in a case in which the operating state of the vehicle corresponds to a low-speed and high-load condition.

The method may further include determining, by the control unit, whether the operating state of the vehicle corresponds to a predetermined high-speed and high-load condition in a case in which the operating state of the vehicle does not correspond to the low-speed and high-load condition, and completely opening the rotary shutter, opening the plurality of flaps, and turning off the operation of the cooling fan by the control unit, in a case in which the operating state of the vehicle corresponds to the high-speed and high-load condition.

The method may further include closing the plurality of flaps, turning off the operation of the cooling fan, and controlling an open area of the radial portion in accordance with the operating state of the vehicle by the control unit, in a case in which the operating state of the vehicle does not correspond to the high-speed and high-load condition.

The system for controlling the air flow rate into the vehicle engine room may further include an intercooler temperature sensor which measures a temperature of an intercooler, and outputs a corresponding signal, and the control unit may determine the operating state of the vehicle while further including a signal of the intercooler temperature sensor.

According to the system for controlling an air flow rate into a vehicle engine room according to various embodiments of the present invention and a control method thereof, cooling performance may be improved by controlling use of the cooling fan based on the driving state of the vehicle, and aero-dynamic performance may be improved by adjusting an amount of air flowing into the vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
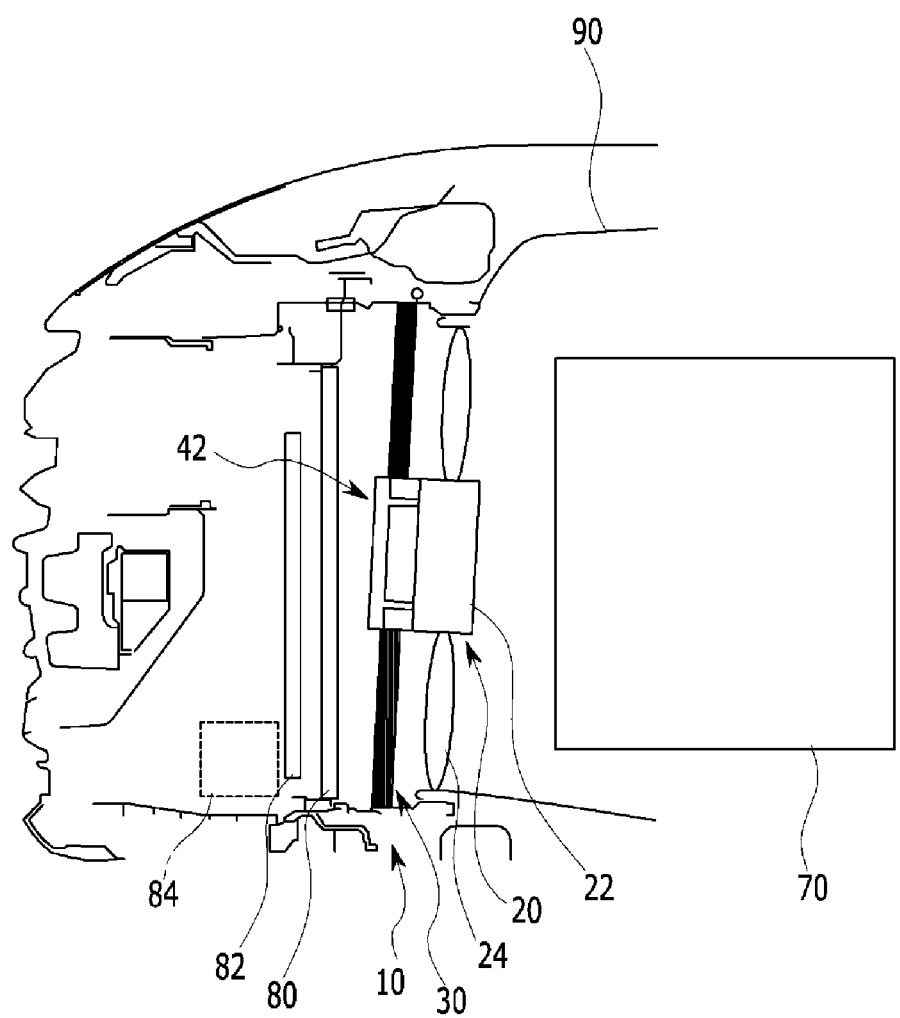
FIG. 1 is a cross-sectional view illustrating an exemplary system for controlling an air flow rate into a vehicle engine room according to the present invention.
Figure 2:
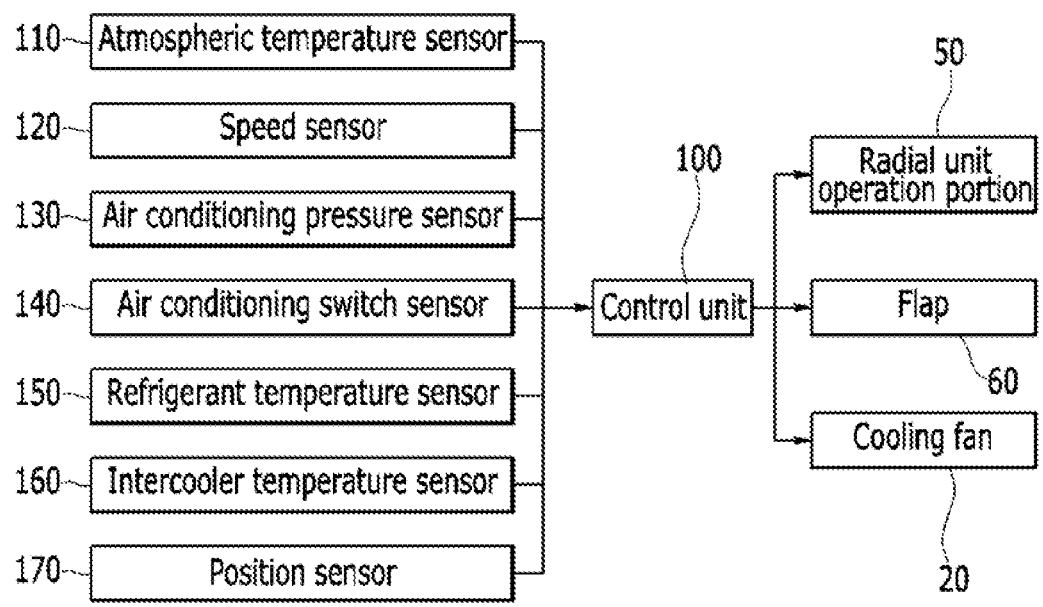
FIG. 2 is a block diagram illustrating the exemplary system for controlling the air flow rate into the vehicle engine room according to the present invention.

FIG. 1 is a cross-sectional view illustrating a system for controlling an air flow rate into a vehicle engine room according to various embodiments of the present invention, and FIG. 2 is a block diagram illustrating the system for controlling an air flow rate into a vehicle engine room according to various embodiments of the present invention.

FIG. 3, FIG. 4, FIG. 5, and FIG. 6 are views illustrating operation modes of the system for controlling an air flow rate into a vehicle engine room according to various embodiments of the present invention, and FIG. 7, FIG. 8, FIG. 9, FIG. 10, FIG. 11, FIG. 12 and FIG. 13 are views illustrating a radial portion of the system for controlling an air flow rate into a vehicle engine room according to various embodiments of the present invention.

Referring to FIG. 1, FIG. 2, FIG. 3, FIG. 4, FIG. 5, FIG. 6, FIG. 7, FIG. 8, FIG. 9, FIG. 10, FIG. 11, FIG. 12 and FIG. 13, a system for controlling an air flow rate into a vehicle engine room according to various embodiments of the present invention provides includes a fan shroud 30 in which a cooling fan 20 including a fan motor 22 and a fan blade 24 is mounted, a radial portion 40 which is provided in the fan shroud 30 while corresponding to an operation area of the fan blade 24, including a shutter hub 42 positioned to a center thereof and a plurality of radial units 44a, 44b and 44c disposed to the shutter hub 42 and including a plurality of radial shutters 43a-43d selectively unfolded from the shutter hub 42 to external circumference directions or selectively folded to the shutter hub direction, and a radial unit operating portion 50 unfolding the plurality of radial units 44a, 44b and 44c from the shutter hub 42 to the external circumference directions or folding the plurality of radial units 44a, 44b and 44c to the shutter hub direction.

In FIG. 7, FIG. 8, FIG. 9, FIG. 10, FIG. 11, FIG. 12 and FIG. 13, while a part of the radial unit is described, however as shown in FIG. 3, FIG. 4, FIG. 5, and FIG. 6, the plurality of radial units may be folded or unfolded to form as a circle.

The system for controlling an air flow rate into a vehicle engine room may further include a plurality of flaps 60 which are provided in the fan shroud 30, and open and closes a part of a portion where the radial portion 40 is not mounted. And the fan shroud 30 provided with the radial shutter 43a-43d and the plurality of flaps 60 is disposed between an engine 70 and a radiator 80.

A condenser 82 may be provided in front of the radiator 80, and an intercooler 84 may be provided in front of the condenser 82.

In addition, the system for controlling an air flow rate into a vehicle engine room according to various embodiments of the present invention may further include an encapsulation 90 that surrounds the engine room, and the encapsulation 90 serves to prevent noise and vibration generated in the engine 70 from being transmitted to the outside of the vehicle body 10, and reduce drag by guiding wind, which is generated when the vehicle travels, when the wind flows into the engine room.

In addition, the encapsulation 90 preserves heat generated in the engine 70, and may enable the engine 70 to be operated at an optimum operation temperature when the vehicle travels again in a predetermined time after the vehicle stops.

The encapsulation 90 may surround a part of the engine 70 or surround the engine 70 completely.

Referring to FIG. 2, the system for controlling an air flow rate into a vehicle engine room may include an atmospheric temperature sensor 110 which measures an atmospheric temperature, and outputs a corresponding signal, a speed sensor 120 which measures a vehicle speed, and outputs a corresponding signal, an air conditioning pressure sensor 130 which measures air conditioning internal pressure, and outputs a corresponding signal, an air conditioning switch sensor 140 which measures an operational signal of an air conditioning switch, and outputs a corresponding signal, a refrigerant temperature sensor 150 which measures a refrigerant temperature, and outputs a corresponding signal, and a position sensor 170 which measures an open area or an operation angle of the radial portion 40, and outputs a corresponding signal.

The control unit 100 determines the operating state of the vehicle based on the corresponding signals from the respective sensor, and controls operations of the radial unit operating portion 50, the plurality of flaps 60, and the cooling fan 20 in accordance with the operating state of the vehicle.

The system for controlling an air flow rate into a vehicle engine room further includes an intercooler temperature sensor 160 which measures a temperature of the intercooler 84, and outputs a corresponding signal, and the control unit 100 may further receive a signal from the intercooler temperature sensor 160 so as to determine the operating state of the vehicle, and control operations of the radial unit operating portion 50, the plurality of flaps 60, and the cooling fan 20.

Referring to FIG. 7, FIG. 8, FIG. 9, FIG. 10, FIG. 11, FIG. 12 and FIG. 13, a side of each of the radial unit 44a, 44b, and 44c is overlapped with a side of the neighboring radial unit 44a, 44b, and 44c so as for the each radial unit 44a, 44b, and 44c to support the neighboring radial unit 44a, 44b, and 44c.

That is, both ends of the plurality of radial units 44a, 44b, and 44c are piled up one on another and support the neighboring radial units 44a, 44b, and 44c.

A guide groove 45a, 45b, and 45c and a guide rail 46a, 46b, 46c and 46d are formed to the each radial shutter 43a, 43b, 43c and 43d and the guide rail 46a, 46b, 46c and 46d formed to the radial shutter 43a, 43b, 43c and 43d positioned outside is inserted into the guide groove 45a, 45b, and 45c formed to the radial shutter 43a, 43b, 43c and 43d positioned inside for guiding movement of the radial shutters 43a, 43b, 43c and 43d.

The radial unit operating portion 50 includes a hub gear 56 disposed to the shutter hub 42, a flexible gear 52 engaged with the hub gear 56 through an end gear 57 and the most outer shutter 43d of the radial shutters 43a, 43b, 43c and 43d, moving the most outer shutter 43d to the center direction or the external circumference directions according to rotation of the hub gear 56, and a servo motor selectively rotating the hub gear 56.

A stopper 47a, 47b, 47c and 47d is formed to the each radial shutter 43a, 43b, 43c and 43d and the each radial shutter 43a, 43b, 43c and 43d is folded by the stopper 47a, 47b, 47c and 47d when the most outer radial shutter 47d moves toward the center of the radial portion 40.

A driving thread 48 is formed to the outermost radial shutter 43d to be engaged with the flexible gear 52 and a gear guide portion 49a, 49b, and 49c is formed to the each radial shutter 43a, 43b, and 43c except for the outermost radial shutter 43 d for guiding the flexible gear 52.

The servo motor 58 is configured to control rotation speed and rotating direction to control unfolded area (spread area) of the radial portion 40 according to control of the control portion 100.

Figure 14A:
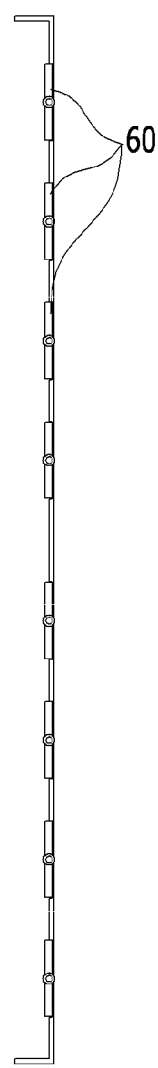
FIG. 14A, FIG. 14B, and FIG. 14C are views illustrating a flap of the exemplary system for controlling the air flow rate into the vehicle engine room according to the present invention.
Figure 14B:
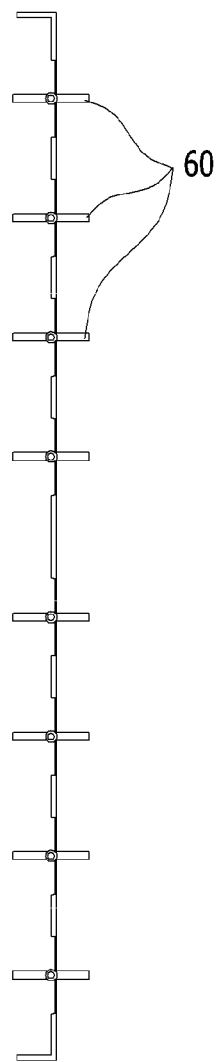
Figure 14C:
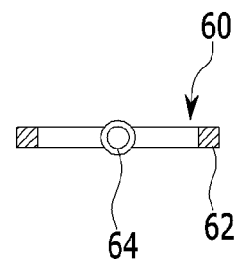

FIG. 14A, FIG. 14B, and FIG. 14C are views illustrating a flap of the system for controlling an air flow rate into a vehicle engine room according to various embodiments of the present invention.

Referring to FIG. 14A, FIG. 14B, and FIG. 14C, electromagnets 62 are provided on the plurality of flaps 60, such that the plurality of flaps 60 may be opened and closed in accordance with an electric current supplied to the electromagnets 62, and flap rotation shafts 64 are provided on the flaps 60, respectively, so that the flaps 60 may be rotated about the rotation shafts 64, respectively.

The flap rotation shaft 64 may be a torsion spring, and the flap 60 may be maintained in an opened state when the electric current is not supplied to the electromagnet 62. In the case of failure of an electric current supply device, the flap 60 is maintained in the opened state so as to prevent the engine 70 from being overheated.

FIG. 3, FIG. 4, FIG. 5, and FIG. 6 are views illustrating operation modes of the system for controlling an air flow rate into a vehicle engine room according to various embodiments of the present invention.

Figure 3:
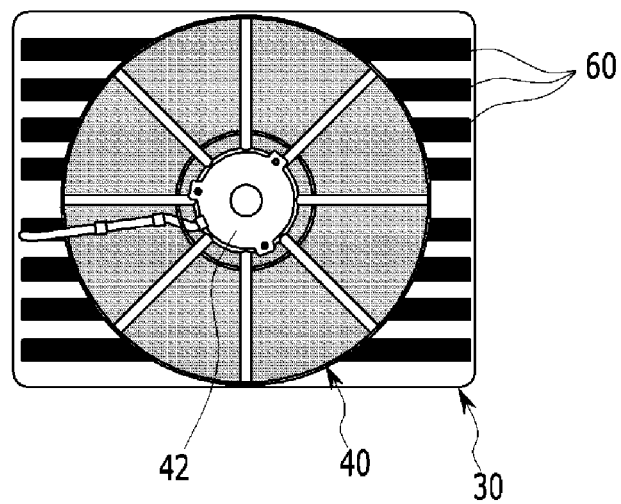
FIG. 3, FIG. 4, FIG. 5, and FIG. 6 are views illustrating operation modes of the exemplary system for controlling the air flow rate into the vehicle engine room according to the present invention.

The operation mode illustrated in FIG. 3 shows a state in which the plurality of flaps 60 are closed, and the radial portion 40 is completely closed, and in this case, the operation of the cooling fan 20 may be turned off.

Figure 4:
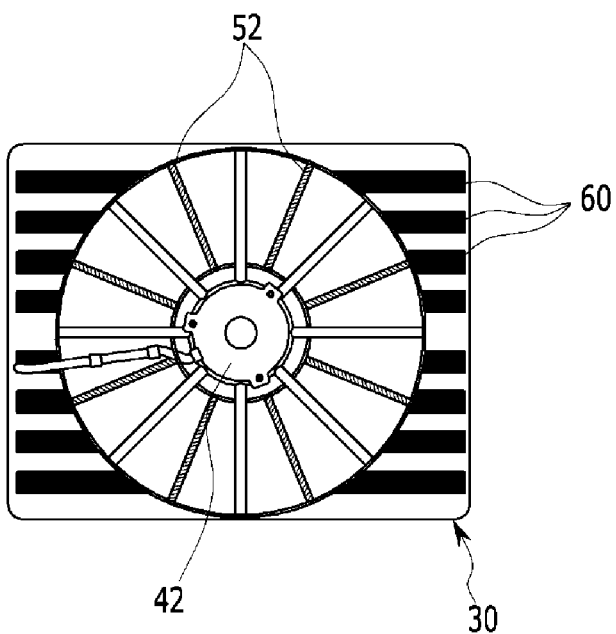

The operation mode illustrated in FIG. 4 shows a state in which the plurality of flaps 60 are closed, and the radial portion 40 is completely opened, and in this case, the operation of the cooling fan 20 may be controlled based on the operating state of the vehicle.

Figure 5:
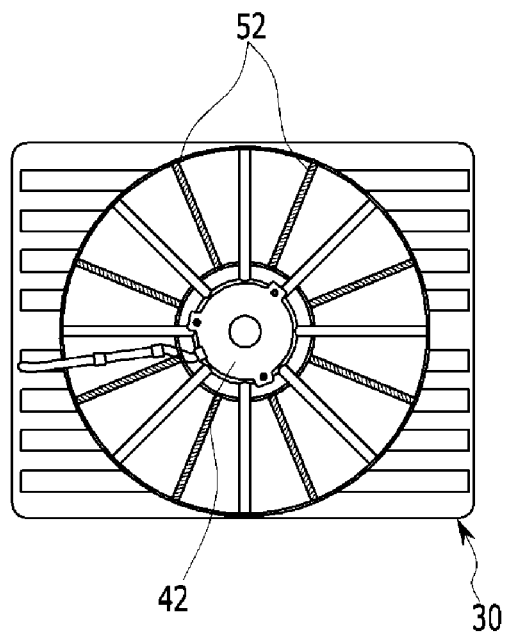

The operation mode illustrated in FIG. 5 shows a state in which the plurality of flaps 60 are opened, and the radial portion 40 is completely opened, and in this case, the operation of the cooling fan 20 may be turned off.

Figure 6:
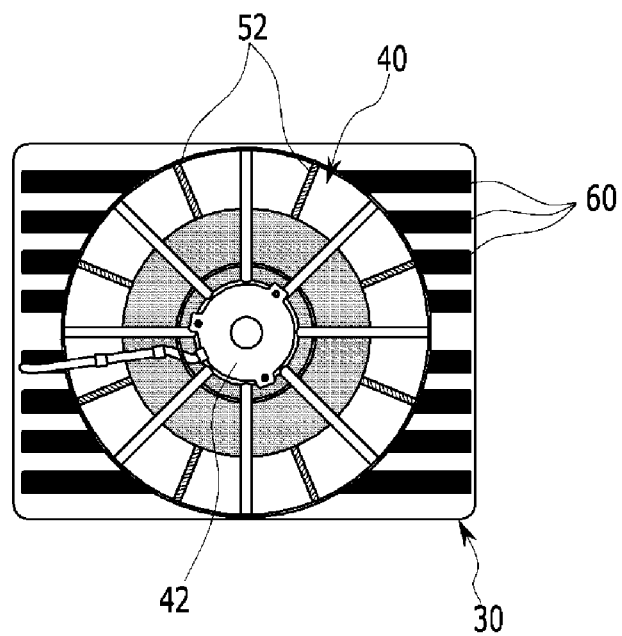
Figure 7:
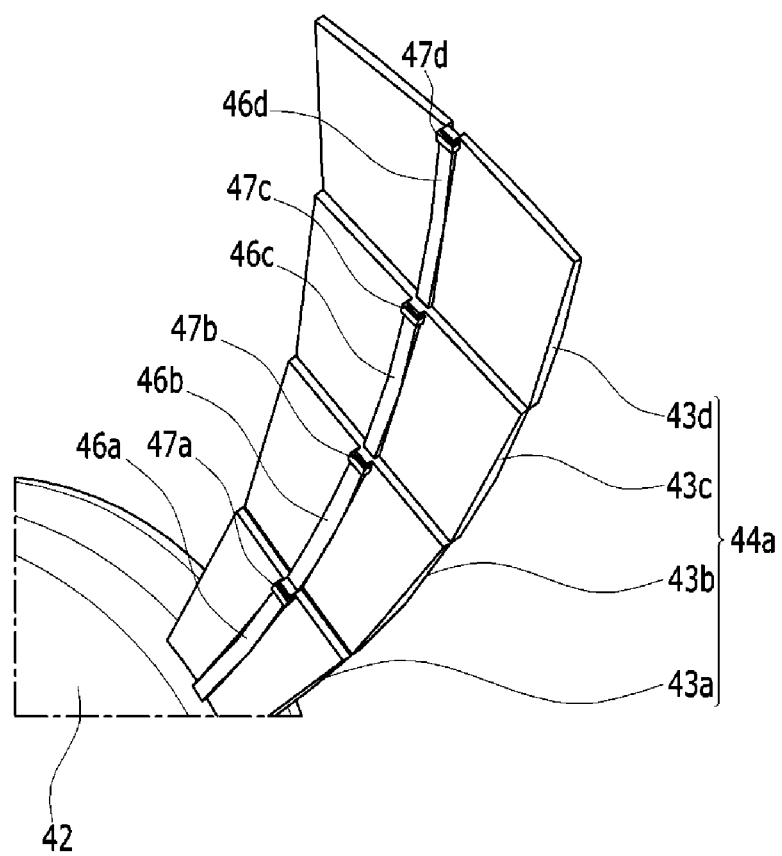
FIG. 7, FIG. 8, FIG. 9, FIG. 10, FIG. 11, FIG. 12 and FIG. 13 are views illustrating a radial portion of the exemplary system for controlling the air flow rate into the vehicle engine room according to the present invention.
Figure 8:
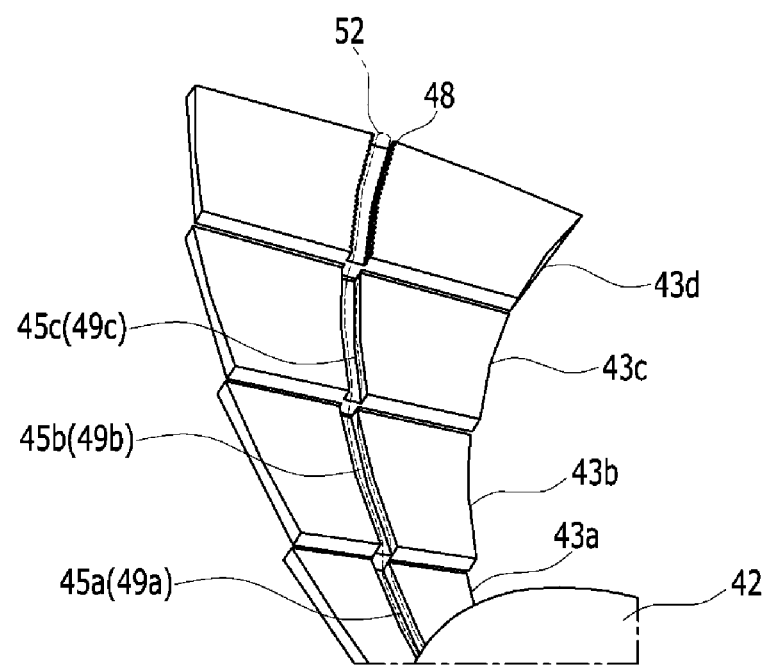
Figure 9:
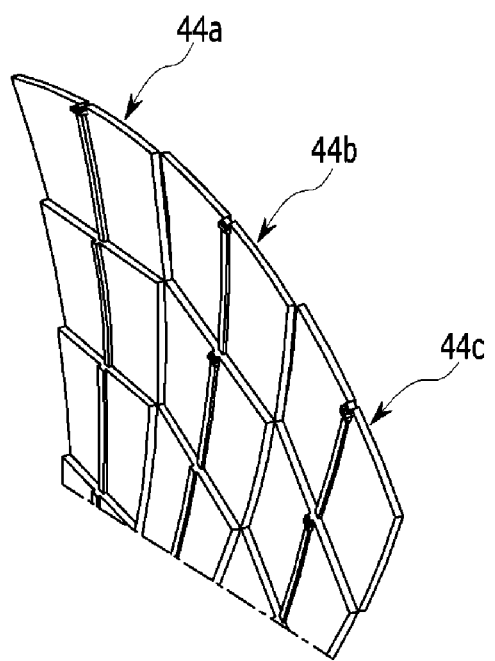
Figure 10:
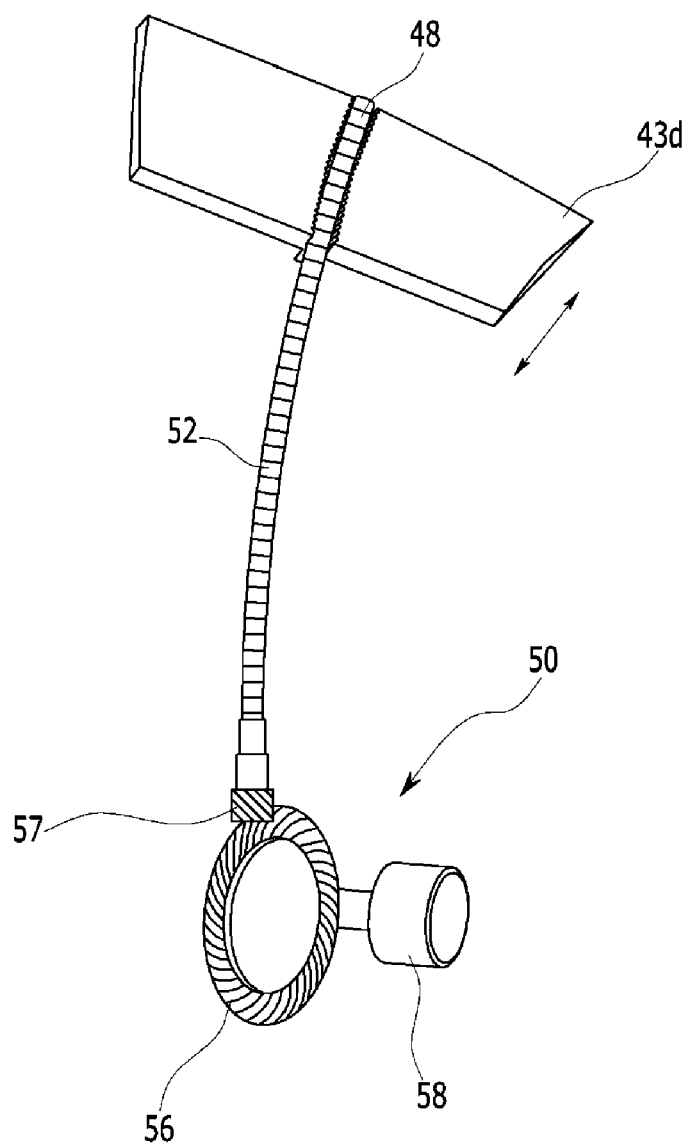
Figure 11:
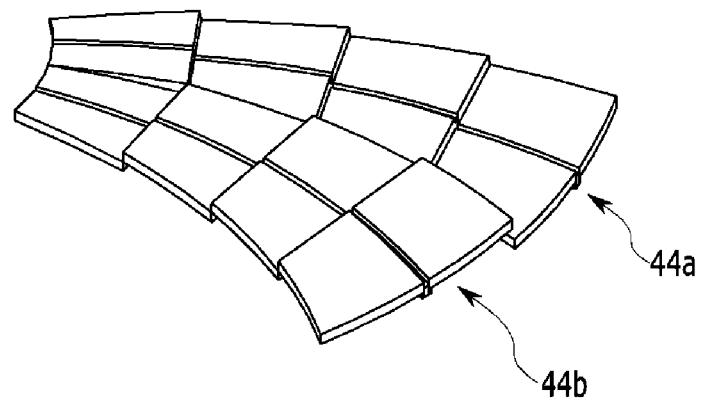
Figure 12:
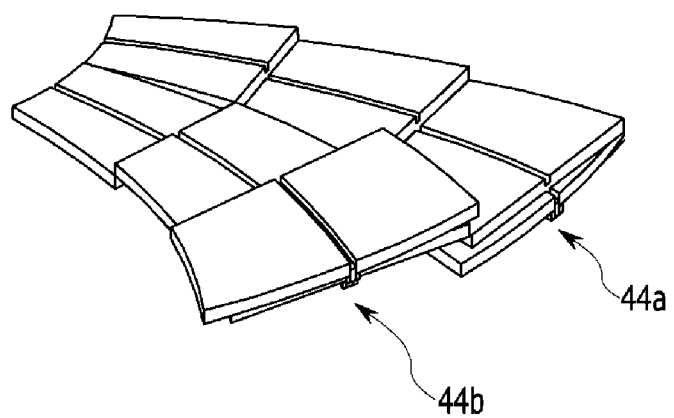
Figure 13:
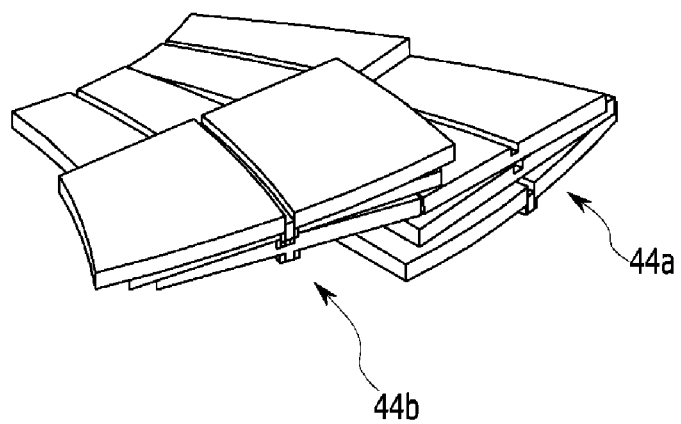

The operation mode illustrated in FIG. 6 shows a state in which the plurality of flaps 60 are closed, and an open area of the radial portion 40 is controlled, and in this case, the operation of the cooling fan 20 may be turned off.

Figure 15:
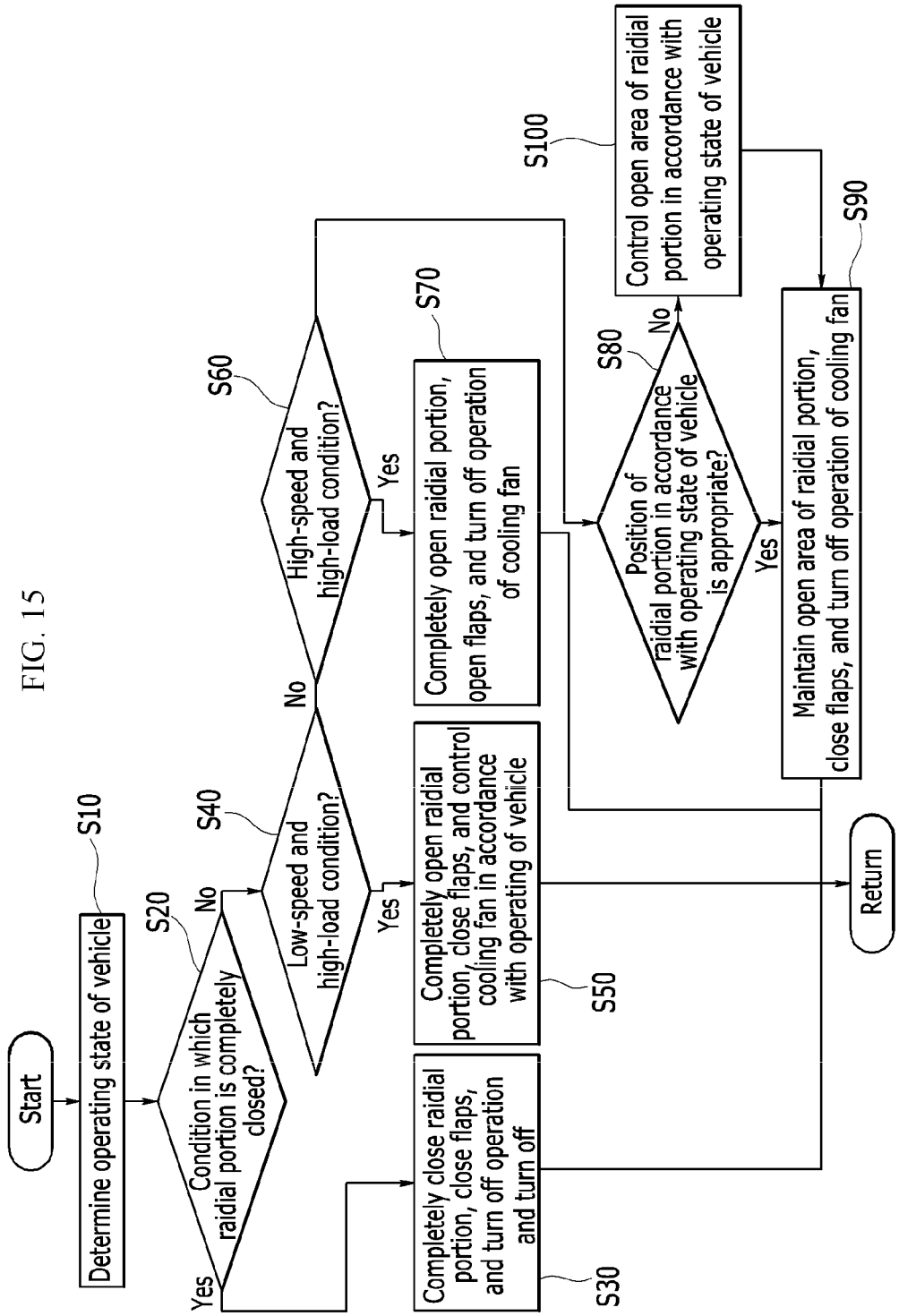
FIG. 15 is a flowchart illustrating a control method of the exemplary system for controlling the air flow rate into the vehicle engine room according to the present invention.

FIG. 15 is a flowchart illustrating a control method of the system for controlling an air flow rate into a vehicle engine room according to various embodiments of the present invention.

Hereinafter, the control method of the system for controlling an air flow rate into a vehicle engine room according to various embodiments of the present invention will be described with reference to FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14A, FIG. 14B, FIG. 14C and FIG. 15.

The control unit 100 determines the operating state of the vehicle based on sensor signals including signals from the atmospheric temperature sensor 110, the speed sensor 120, the air conditioning pressure sensor 130, the air conditioning switch sensor 140, and the refrigerant temperature sensor 150 (S10), and determines whether it is necessary to completely close the radial portion 40 based on the determined operating state of the vehicle (S20).

The state in which it is necessary to completely close the radial portion 40 is a state in which cooling is not required, and for example, may be a state in which it is necessary to warm up the engine 70 for a predetermined time after the engine of the vehicle starts, a state in which it is necessary to maintain a temperature of the engine 70 by turning off the engine, and a state in which the vehicle travels in a low-speed and low-load state. The corresponding condition may be stored in a predetermined map in advance, and the control unit 100 may compare the map with the operating state of the vehicle so as to determine whether it is necessary to completely close the radial portion 40.

In a case in which it is necessary to completely close the rotary shutter, the control unit 100 completely closes the radial portion 40, closes the plurality of flaps 60, and turns off the operation of the cooling fan 20 (S30).

In this case, it is possible to warm up the engine 70 and maintain an appropriate temperature, and aero-dynamic characteristics may be improved by shutting off air flowing into the engine room because the radial portion 40 and the plurality of flaps 60 are closed.

In a case in which it is not necessary to completely close the rotary shutter, the control unit 100 determines whether the operating state of the vehicle corresponds to a predetermined low-speed and high-load condition (S40). In a case in which the operating state of the vehicle corresponds to the low-speed and high-load condition, the control unit 100 completely opens the radial portion 40, closes the plurality of flaps 60, and controls the operation of the cooling fan 20 in accordance with the operating state of the vehicle (S50).

For example, the predetermined low-speed and high-load condition may mean a state in which a vehicle speed is approximately 30 to 40 kph, and an engine RPM is 2000 to 4000, or may be defined as a state in which cooling by the operation of the cooling fan 20 is required. That is, the low-speed and high-load condition may be defined as a condition in which cooling is required, but cooling by the wind, which is generated when the vehicle travels, is not sufficient.

The corresponding condition is stored in the predetermined map, the control unit 100 may compare the map with the operating state of the vehicle so as to determine whether it is necessary to operate the cooling fan 20, and the control unit 100 controls the operation of the cooling fan 20 in accordance with the operating state of the vehicle. The control unit 100 may operate the cooling fan 20 while determining the number of revolutions of the cooling fan 20 based on the predetermined map, or the control unit 100 may continuously or intermittently operate the cooling fan 20 while determining an operation time of the cooling fan 20.

In a case in which the operating state of the vehicle does not correspond to the low-speed and high-load condition, the control unit 100 determines whether the operating state of the vehicle corresponds to a predetermined high-speed and high-load condition (S60). In a case in which the operating state of the vehicle corresponds to the high-speed and high-load condition, the control unit 100 completely opens the radial portion 40, opens the plurality of flaps 60, and turns off the operation of the cooling fan 20 (S70).

For example, the predetermined high-speed and high-load condition may mean a state in which a vehicle speed is approximately 90 to 110 kph, and an engine RPM is 2000 to 4000, or may be defined as a condition in which cooling is required, and cooling by the wind, which is generated when the vehicle travels, is sufficient.

The corresponding condition is stored in the predetermined map, and the control unit 100 may compare the map with the operating state of the vehicle so as to determine whether cooling by the wind, which is generated when the vehicle travels, is required.

In a case in which the operating state of the vehicle does not correspond to the high-speed and high-load condition, the control unit 100 closes the plurality of flaps 60, turns off the operation of the cooling fan 20, and controls the open area of the radial portion 40 based on the operating state of the vehicle (S80, S90, and S100).

That is, based on the operating state of the vehicle, the control unit 100 determines whether cooling is required, the operation of the cooling fan 20 is not needed, and the wind flowing into the vehicle needs to be controlled.

The corresponding condition is stored in the predetermined map, the control unit 100 may compare the map with the operating state of the vehicle so as to determine whether the operation of the radial portion 40 is required, and the control unit 100 determines the open area of the radial portion 40 in accordance with the operating state of the vehicle, and controls the opening operation of the radial portion 40.

The control unit 100 determines whether a position of the radial portion 40, that is, the open area of the radial portion 40 is appropriate using the position sensor 170. That is, the control unit 100 determines whether the current open area of the radial portion 40 corresponds to the determined open area of the radial portion 40 (S80). In a case in which the current open area of the radial portion 40 does not correspond to the determined open area of the radial portion 40, the control unit 100 controls the operation of the shutter actuator 44, and controls the open area of the radial portion 40 (S100).

Further, the control unit 100 closes the plurality of flaps 60, turns off the operation of the cooling fan 20, and maintains the open area of the radial portion 40 (S90).

In a case in which the intercooler 84 is mounted on the engine 70, the control unit 100 may further include the corresponding signal of the intercooler temperature sensor 160 so as to determine the operating state of the vehicle.

As described above, according to the system for controlling an air flow rate into a vehicle engine room according to various embodiments of the present invention and a control method thereof, cooling performance may be improved by controlling use of the cooling fan based on the driving state of the vehicle, and aero-dynamic performance may be improved by adjusting an amount of air flowing into the vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling an air flow rate into a vehicle engine room, comprising:
   a fan shroud in which a cooling fan including a fan motor and a fan blade is mounted;
   a radial portion which is provided in the fan shroud while corresponding to an operation area of the fan blade, including a shutter hub positioned to a center thereof and a plurality of radial units disposed to the shutter hub and including a plurality of radial shutters telescopically extending from the shutter hub to external circumference directions or telescopically collapsing to the shutter hub direction; and
   a radial unit operating portion telescopically extending the plurality of radial units from the shutter hub to the external circumference directions or telescopically collapsing the plurality of radial units to the shutter hub direction.

2. The system of claim 1, wherein a side of each of the radial units is overlapped with a side of a neighboring radial unit in order for each radial unit to support the neighboring radial unit.

3. The system of claim 2, wherein:
   a guide groove and a guide rail are formed to each radial shutter, and
   the guide rail formed to the radial shutter positioned outside is inserted into the guide groove formed to the radial shutter positioned inside for guiding movement of the radial shutters.

4. The system of claim 3, wherein the radial unit operating portion comprises:
   a hub gear disposed to the shutter hub;

a flexible gear engaged with the hub gear and an outermost shutter of the radial shutters, moving the most outer shutter to a center direction or the external circumference directions according to rotation of the hub gear; and a servo motor selectively rotating the hub gear.

5. The system of claim 4, wherein:
a stopper is formed to each radial shutter, and
each radial shutter is folded by the stopper when the outermost radial shutter moves toward a center of the radial portion.

6. The system of claim 4, wherein:
a driving thread is formed to the outermost radial shutter to be engaged with the flexible gear, and
a gear guide portion is formed to each radial shutter except for the outermost radial shutter for guiding the flexible gear.

7. The system of claim 4, wherein the servo motor is configured to control rotation speed and rotating direction.

8. The system of claim 1, further comprising a plurality of flaps which are provided in the fan shroud, and open and close a part of a portion where the radial portion is not mounted.

9. The system of claim 8, wherein:
electromagnets are provided on the plurality of flaps so that the plurality of flaps are opened and closed in accordance with an electric current supplied to the electromagnets.

10. The system of claim 8, wherein:
the fan shroud in which the radial shutter and the plurality of flaps are provided, is mounted between an engine and a radiator.

11. The system of claim 10, further comprising:
an encapsulation which surrounds the engine room.

12. The system of claim 8, further comprising:
a control portion which controls operations of the radial unit operating portion, the flap and the cooling fan according to operation conditions of a vehicle in predetermined modes, wherein
the predetermined modes comprise:
a first mode in which the plurality of flaps is closed, the radial shutter is completely closed, and operation of the cooling fan is turned off;
a second mode in which the plurality of flaps is closed, the radial shutter is completely opened, and the operation of the cooling fan is controlled based on an operating state of the vehicle;
a third mode in which the plurality of flaps is opened, the radial shutter is completely opened, and the operation of the cooling fan is turned off; and
a fourth mode in which the plurality of flaps is closed, the open area of the radial shutter is controlled, and the operation of the cooling fan is turned off.

13. The system of claim 12, further comprising:
an atmospheric temperature sensor which measures an atmospheric temperature, and outputs a corresponding signal;
a speed sensor which measures a vehicle speed, and outputs a corresponding signal;
an air conditioning pressure sensor which measures air conditioning internal pressure, and outputs a corresponding signal;
an air conditioning switch sensor which measures an operational signal of an air conditioning switch, and outputs a corresponding signal; and
a refrigerant temperature sensor which measures a refrigerant temperature, and outputs a corresponding signal,
wherein the control unit determines the operating state of the vehicle based on the corresponding signals from the respective sensors, and controls operations of the radial unit operating portion, the plurality of flaps, and the cooling fan in accordance with the operating state of the vehicle in any one mode of the first to fourth modes.

14. The system of claim 13, further comprising:
an intercooler temperature sensor which measures a temperature of an intercooler, and outputs a corresponding signal,
wherein the control unit further receives a signal from the intercooler temperature sensor so as to determine the operating state of the vehicle, and controls operations of the radial unit operating portion, the plurality of flaps, and the cooling fan in any one mode of the first to fourth modes.

15. A control method of a system for controlling an air flow rate into a vehicle engine room, and the method comprising:
determining, by a control unit, an operating state of a vehicle based on sensor signals including signals of an atmospheric temperature sensor, a speed sensor, an air conditioning pressure sensor, an air conditioning switch sensor, a refrigerant temperature sensor, and a position sensor, and determining whether it is required to completely close a radial portion in accordance with the determined operating state of the vehicle; and
completely closing, the radial portion, closing a plurality of flaps, and turning off operation of a cooling fan by the control unit in a state in which it is required to completely close a rotary shutter,
wherein the system comprises the atmospheric temperature sensor which measures an atmospheric temperature, and outputs the corresponding signal, the speed sensor which measures a vehicle speed, and outputs the corresponding signal, the air conditioning pressure sensor which measures air conditioning internal pressure, and outputs the corresponding signal, the air conditioning switch sensor which measures an operational signal of an air conditioning switch, and outputs the corresponding signal, the refrigerant temperature sensor which measures a refrigerant temperature, and outputs the corresponding signal, a fan shroud in which the cooling fan including a fan motor and a fan blade is mounted, the radial portion which is provided in the fan shroud while corresponding to an operation area of the fan blade, including a shutter hub positioned to a center thereof and a plurality of radial units disposed to the shutter hub and including a plurality of radial shutters telescopically extending from the shutter hub to external circumference directions or telescopically collapsing to a shutter hub direction, a radial unit operating portion unfolding the plurality of radial units from the shutter hub to the external circumference directions or folding the plurality of radial units to the shutter hub direction, the plurality of flaps which are provided in the fan shroud, and opens and closes a part of a portion where the radial portion is not mounted and a control portion which controls operations of each radial unit operating portion, each flap and the cooling fan according to operation conditions of the vehicle.

16. The method of claim 15, further comprising:
determining, by the control unit, whether the operating state of the vehicle corresponds to a predetermined low-speed and high-load condition in a case in which it is not required to completely close the rotary shutter; and completely opening the radial portion, closing the plurality of flaps, and controlling the operation of the cooling fan in accordance with the operating state of the vehicle by the control unit in a case in which the operating state of the vehicle corresponds to a low-speed and high-load condition.

17. The method of claim 16, further comprising:
determining, by the control unit, whether the operating state of the vehicle corresponds to a predetermined high-speed and high-load condition in a case in which the operating state of the vehicle does not correspond to the low-speed and high-load condition; and
completely opening the rotary shutter, opening the plurality of flaps, and turning off the operation of the cooling fan by the control unit in a case in which the operating state of the vehicle corresponds to the high-speed and high-load condition.

18. The method of claim 17, further comprising:
closing the plurality of flaps, turning off the operation of the cooling fan, and controlling an open area of the radial portion in accordance with the operating state of the vehicle by the control unit, in a case in which the operating state of the vehicle does not correspond to the high-speed and high-load condition.

19. The method of claim 18, wherein the system for controlling the air flow rate into the vehicle engine room further includes an intercooler temperature sensor which measures a temperature of an intercooler, and outputs a corresponding signal, and
the control unit determines the operating state of the vehicle while further including a signal of the intercooler temperature sensor.

\* \* \* \* \*